United States Patent [19]

Dieringer et al.

[11] Patent Number: 5,658,055
[45] Date of Patent: Aug. 19, 1997

[54] VEHICLE BRAKE SYSTEM HAVING AN ELECTRONICALLY CONTROLLED BOOSTER

[75] Inventors: Werner Dieringer, Vallendar; Jens-Peter Kohrt, Koblenz; Kurt Mohr, Halsenbach-Ehr; Helmut Heibel, Moschheim; Erwin Michels, Kail; Hans-Werner Renn, Andernach, all of Germany

[73] Assignee: Lucas Industries public limited company, Solihull, Great Britain

[21] Appl. No.: 501,561

[22] Filed: Jul. 12, 1995

[30] Foreign Application Priority Data

Jul. 27, 1994 [DE] Germany .............. 94 111 737.6

[51] Int. Cl.$^6$ .................. B60T 8/44; B60T 13/68
[52] U.S. Cl. .................. 303/114.3; 188/356; 303/113.4; 303/125
[58] Field of Search .............. 303/113.4, 119.2, 303/113.3, 125, 114.1, DIG. 3, DIG. 4, 3, 114.2, 20, 135, 133, 122.11, 122.15, 114.3; 91/369.1, 369.2, 369.3, 369.4, 367, 376 R, 376 A, 459; 60/545, 534; 188/355-360, 1.11

[56] References Cited

U.S. PATENT DOCUMENTS

| | | | |
|---|---|---|---|
| 4,395,883 | 8/1983 | Melinat | 303/113.4 |
| 4,580,847 | 4/1986 | Burgdorf | 303/113.4 |
| 4,620,750 | 11/1986 | Leiber | 303/113.4 |
| 4,653,813 | 3/1987 | Burgdorf | 303/113.4 |
| 4,773,301 | 9/1988 | Shimamura et al. | 188/355 |
| 4,818,036 | 4/1989 | Reinecke | 303/15 |
| 4,826,255 | 5/1989 | Volz | 303/113.4 |
| 4,919,493 | 4/1990 | Leiber | 303/15 |
| 5,022,716 | 6/1991 | Siegel et al. | 303/113.4 |
| 5,098,171 | 3/1992 | Siegel | 303/113.4 |
| 5,123,717 | 6/1992 | Willmann | 303/113.4 |
| 5,141,295 | 8/1992 | Burgdorf et al. | 303/113.4 |
| 5,178,441 | 1/1993 | Heibel et al. | 303/114.3 |
| 5,201,573 | 4/1993 | Leiber et al. | 303/113.4 |
| 5,224,410 | 7/1993 | Graichen et al. | 303/114.3 |
| 5,226,312 | 7/1993 | Gautier et al. | 188/1.11 |
| 5,230,549 | 7/1993 | Osada et al. | 303/113.4 |
| 5,350,224 | 9/1994 | Nell et al. | 303/113.4 |
| 5,350,225 | 9/1994 | Steiner et al. | 303/113.4 |
| 5,367,942 | 11/1994 | Nell et al. | 303/113.3 |
| 5,421,643 | 6/1995 | Kircher et al. | 303/113.4 |
| 5,427,442 | 6/1995 | Heibel | 303/DIG. 4 |
| 5,460,074 | 10/1995 | Balz et al. | 303/113.4 |
| 5,479,844 | 1/1996 | Heibel et al. | 303/113.3 |

FOREIGN PATENT DOCUMENTS

| | | | |
|---|---|---|---|
| 4021699 | 1/1992 | Germany | 303/113.4 |
| 9202154 | 4/1992 | Germany | . |
| 58-188746 | 11/1983 | Japan | . |
| 59-118559 | 7/1984 | Japan | 303/114.1 |
| 59-128038 | 7/1984 | Japan | 303/114.1 |
| 60-88673 | 5/1985 | Japan | 303/DIG. 3 |
| 60-92151 | 5/1985 | Japan | 303/113.3 |

*Primary Examiner*—Douglas C. Butler
*Attorney, Agent, or Firm*—Wood, Herron & Evans, P.L.L.

[57] ABSTRACT

The vehicle brake system including an electronically controlled brake booster (10), comprising a first actuator (350) which is connected to a second actuator (360) for transmitting to the same an actuating movement (P) of a brake pedal, wherein the second actuator (360) transmits the movement to a master brake cylinder, a signal generator (365) disposed between first and second actuators (350, 360) for generating a signal to be supplied to the controller of the brake booster (10), wherein the signal generator (365) is triggered by a relative movement between the first actuator and the housing of the brake booster.

23 Claims, 8 Drawing Sheets

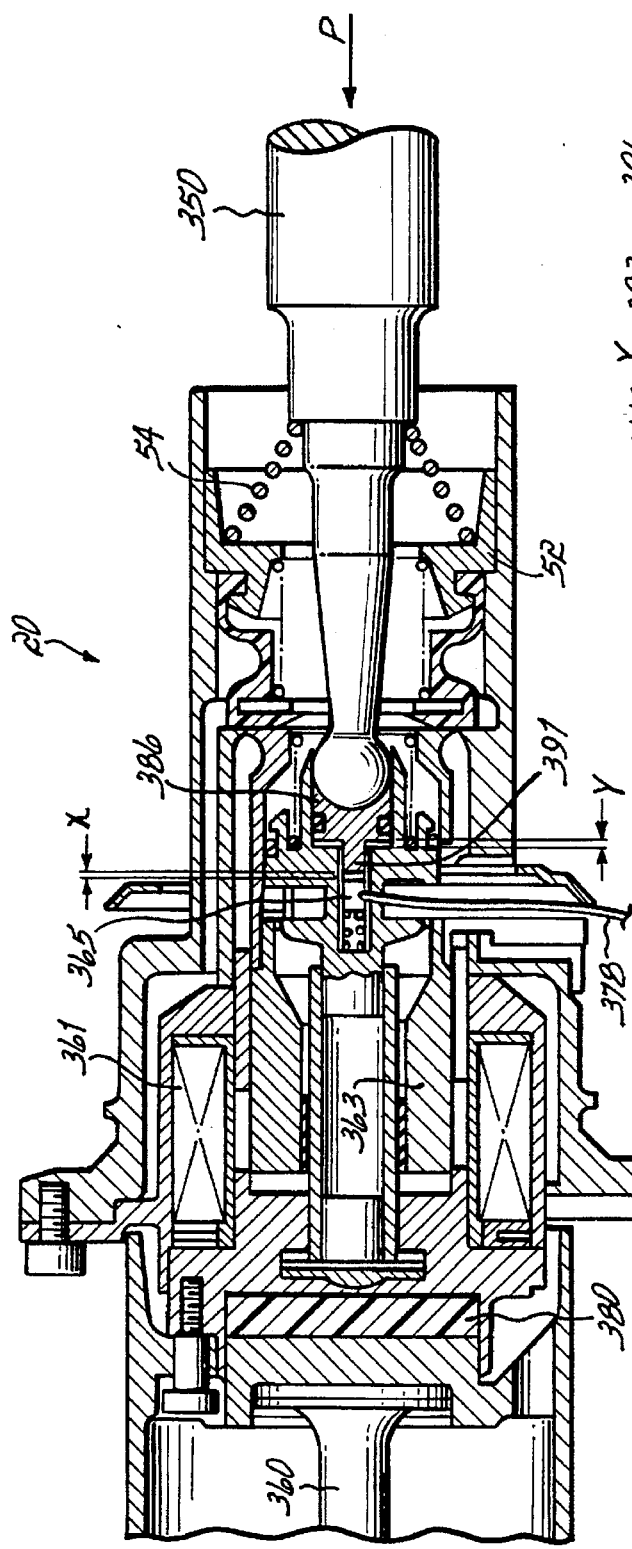
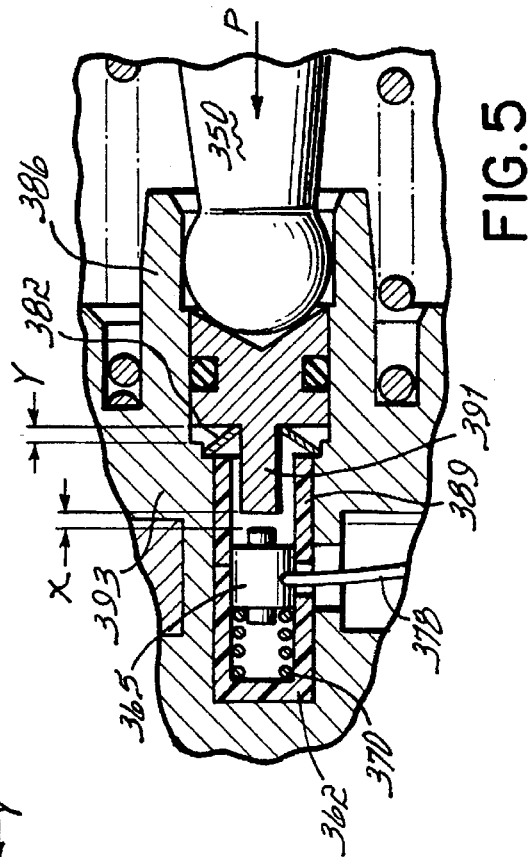
FIG. 4
FIG. 5

VEHICLE BRAKE SYSTEM HAVING AN ELECTRONICALLY CONTROLLED BOOSTER

SUMMARY OF THE INVENTION

The invention concerns a vehicle brake system having an electronically adjustable brake booster.

BACKGROUND OF THE INVENTION

The demand on vehicle brake systems having brake boosters is to optimally perform a braking operation initiated by the driver even if the driver's behavior is not always commensurate with the respective situation involved. To this end, electromagnetically actuated control means for additional are were provided which were activated in response to the actuation dynamics of the brake pedal (cf. the previously filed and post-published German patent applications P 42 17 409 and P 43 09 850 of the applicant).

In the case of an emergency braking, when the braking operation is enhanced by a brake booster, the boosting operation has been increased to an extent as allowed by the pressure differential in the individual chambers of the brake booster. The actuation velocity of the brake pedal was used as the triggering criterion. As soon as a given threshold value of the actuation velocity was surpassed, the maximally possible amplification f the brake boosting operation was initiated. Although this operation results in a considerably shortened brake path, the driver is deprived of the control of the braking operation in that a once initiated full braking proceeds entirely automatically, in other words the driver is no longer in a position to intervene in the braking operation. It is however desirable to stop full braking or emergency braking operations by an intervention on the part of the driver, for instance when the danger does not exist anymore.

In order to control the process of braking initiated by the driver more thoroughly by an electronic control device (ABS) it is very advantageous to have an indication on the dynamics of the braking, i.e. with which velocity per time unit and with which force (of the time unit) the brake pedal is operated by a driver. Indications on these characteristics are very helpful to further optimise the course of a braking process, since the electronic control device can more acutely and more efficiently activate the automatic braking.

Based on the above, the problem underlying the present invention is to provide an apparatus by which a driver-initiated sudden stopping of an emergency braking operation is determined safely and free of interferences and which allows for a control of the braking process to achieve a shorter braking path.

For solving said problem, the afore named apparatus has been further developed by the features of the appended claims.

Further characteristics and advantages entailed by the intention will be described in greater detail in the following description of embodiments of the invention, with reference to the enclosed drawings.

BRIEF DESCRIPTION OF THE DRAWINGS

FIG. 4 shows a further embodiment of a control valve for a brake booster in a sectional view.

FIG. 5 shows a partial enlarged view of a switch means used in the embodiment of FIG. 4.

DETAILED DESCRIPTION OF PARTICULAR EMBODIMENTS

Figure 1:
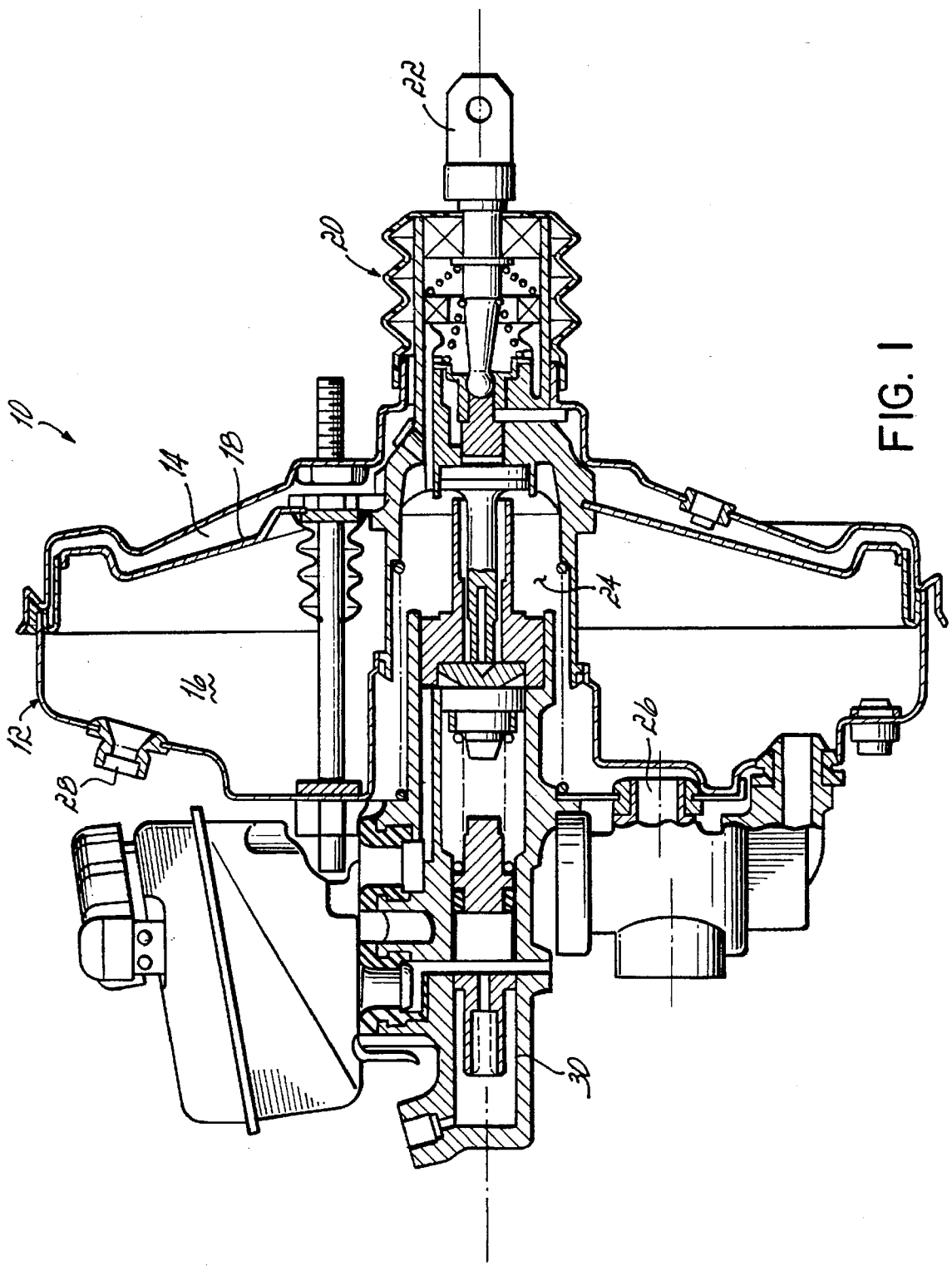
FIG. 1 shows a brake booster in a schematic sectional view.

FIG. 1 is a general view of a brake booster of a vehicle brake system which is provided with a switch means according to the invention.

The illustrated brake booster 10 has a substantially rotation-symmetrical housing 12 with a rear chamber 14 and a front chamber 16 which are separated by a movable partition 18. The brake booster includes a first controllable valve 20 which is connected to moveable partition 18 for joint relative movement with respect to housing 12. The front end of a rod-shaped actuator 22 acts on valve 20, which, in the built-in or assembled condition, is connected to a brake pedal (not illustrated) of the motor vehicle.

Rear chamber 14 is connected to a defined central space 24 of the brake booster 10 by a check valve in such a way that air from said pace 24 can flow into rear chamber 14, but cannot return. Central space 24 also communicates with a port 26 in housing 12 so as to admit air. Another port 28 in housing 12 for sucking off air is assigned to front chamber 16.

A power output member 30 is provided in central space 24 of the brake booster and rests against controllable valve 20. Power output member 30 is provided to actuate a master brake cylinder (not illustrated).

In the inoperative condition illustrated, with the low-pressure or vacuum source switched off, atmospheric pressure prevails in both chambers 14 and 16. Vacuum builds up in front chamber 16 when the vacuum source is switched on, for instance, during running of the engine with whose intake pipe the vacuum port 28 communicates so that the movable partition 18 is shifted slightly forwardly, accompanied by movement of valve 20, whereby the pressure once again becomes balanced between the two chambers 14 and 16. This position of readiness makes sure that from here on the brake pressure booster can be actuated without a loss distance.

The brake booster 10 operates in the usual manner when the brake is normally actuated by the driver and the connection between the two chambers 14 and 16 is interrupted via controllable valve 20 and ambient air flows into rear chamber 14. As a consequence, an actuating force amplified by the brake booster is available at power output member 30. This is true also in a case where vacuum continues to prevail in central space 24—as it does in front chamber 16.

All the following embodiments have in common, that they are able to sense a interruption of supported braking by providing two independent signal generation means in case one of the two fails after the automatic (supported) braking has been initiated. Besides this redundancy aspect allows this "dual signal generation means concept" for a very flexible and efficient evaluation of the way a brake pedal is pressed down, is held, and is released by a driver. By this evaluation the optimal operation of the automatic brake can be achieved.

To achieve this, the coming into contact and the loosening of the contact between the disc or plate 374 and the pin 368 is sensed. This means that all following embodiments of the signal generation means can sense the coming into contact as well as the loosening of the contact and submit a corresponding signal to the electronic control device.

Figures 2, 3:
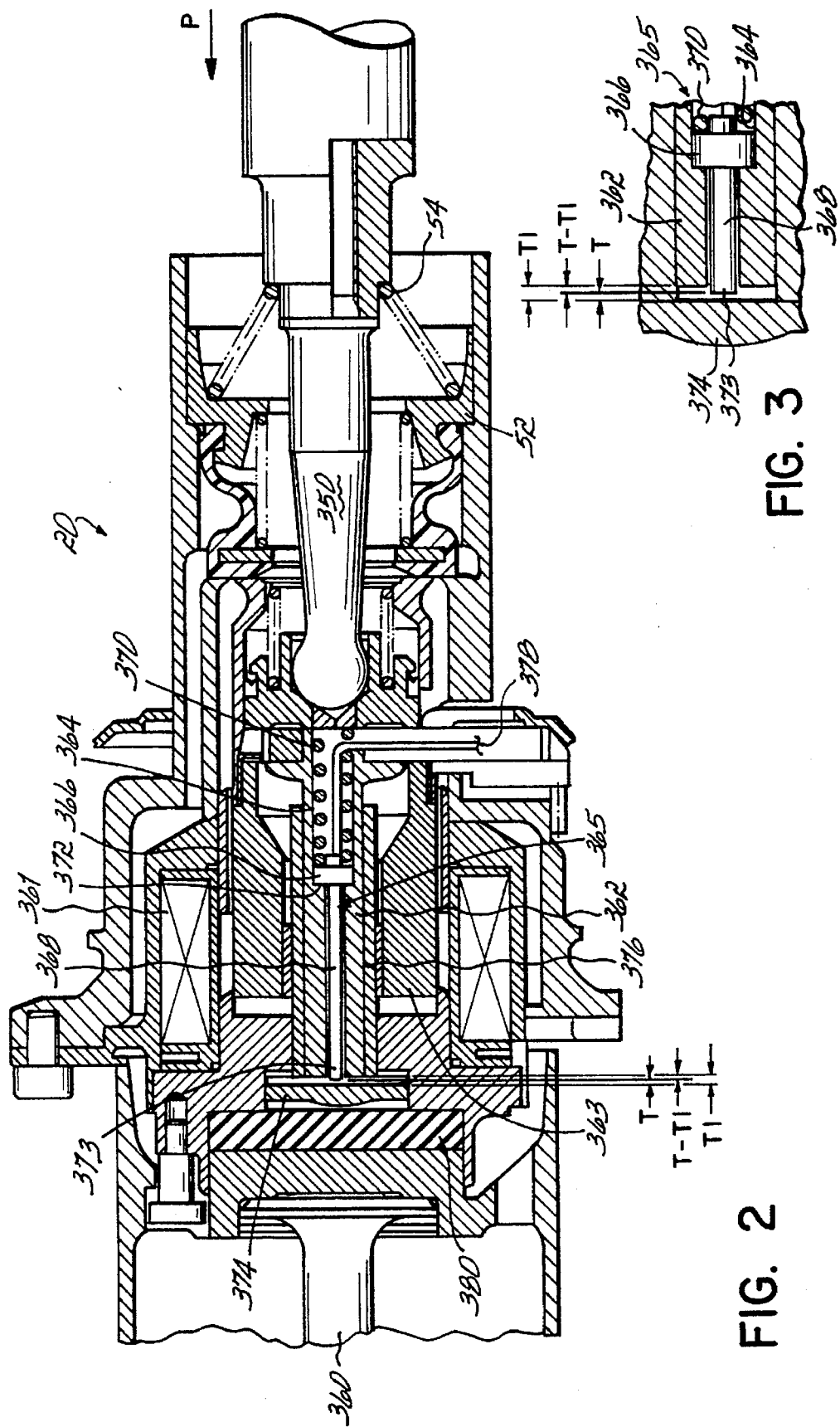
FIG. 2 shows a further embodiment of a control valve for a brake booster in a sectional view.
FIG. 3 shows a partial enlarged view of a switch means used in the embodiment of FIG. 2.

In FIG. 2, 3, the electromagnetic actuation of the control valve 20 is formed by a solenoid coil 361 and a plunger 363 and a signal generation means 365. The signal generation means 365 in FIG. 1, 2 is disposed between a first and a second actuator 350, 360 which transmit an actuating movement P of a brake pedal to a (non-illustrated) master brake cylinder. A valve piston is formed by a sleeve member 362 in FIG. 2. The sleeve member 362 comprises a stepped bore 364 which receives a head portion 366 of a contact member 365 forming the signal generation means. A pin 368 of said contact member 365 extends through the sleeve 365. The head portion 366 of the contact member 365 is resiliently biased by a coil spring 370 against a step 372 of the stepped bore 364. The free end of the pin 368 faces a plate 374. In an inoperative position of the brake booster, the free end 373 has a predetermined distance T from the plate 374.

The sleeve 362 is received in a tube 376 so as to be axially slideable therein. The tube 376 extends the sleeve 362 at its end facing the plate 374 by a distance T1 in the inoperative position of the brake booster.

Upon an axial movement of the first actuator 350 by distance T1, the plate 374 contacts the end 373 of the pin 368 facing the plate 374. Consequently, the signal generation means 365 is triggered to provide a signal via the electrical wire 378 which is propagated to the (non-illustrated) electronical control device. A further axial movement of the actuator 350 by a distance T-T1 causes the sleeve 362 to contact the plate 374. Thereby, the plate 374 is urged against the second actuator 360 via a rubber element 380. In the fully actuated position, the pin 368 of the contact member 365 is completely withdrawn in the sleeve 362 and moved against the coil spring 370 towards the first actuator 350.

Figure 7:
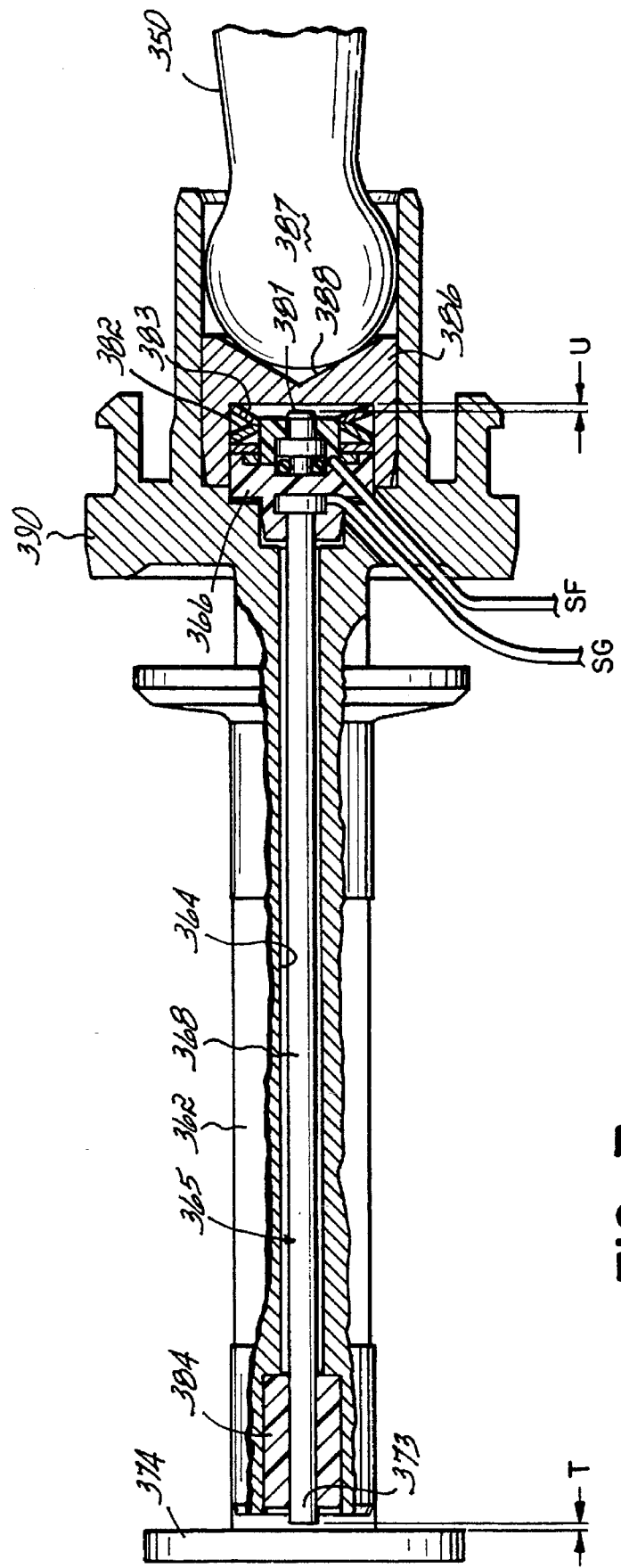
FIG. 7 shows a partial enlarged view of a switch means to be used in the embodiment of FIG. 2.

As can also be seen in FIG. 7, the pin 368 of the contact member 365 is held within the stepped bore 364 by an electrically insulating ring 384 at the end of the sleeve 362 facing the plate 374. The head portion 366 of the contact member 365 is also made of a electrically insulating material. Thus the pin 368 can be held on a predefined electrical potential. Each time, when the free end of the pin 368 facing the plate 374 comes into electrical and/or mechanical contact with the plate 374 which is connected with the ground potential of the vehicle, this can be sensed. The signal SG generated thereby is used by the electronic control device (not shown).

FIG. 4 and 5 show a further embodiment of the invention. Identical reference numerals as in FIG. 2, 3 are related to identical or similar parts. In this embodiment, the signal generation means 365 is received in a sleeve 362 in which a coil spring 370 urges the signal generation means against a ring 389 limiting the axial movement of the signal generation means 365 in a direction against the movement P of the actuator 350. In an inoperative position, the signal generation means 365 is held at a distance Y-X from an abutment 391 by a disc spring corresponding to disc spring arrangement 370. The abutment 391 is projecting through the disc spring 370 and is integrally formed with the trigger member 386. Upon an axial movement of the first actuator 350 in the direction P, the first actuator 350 must cover the distance X before it causes a triggering of a signal by a signal generation means 365. As soon as the first actuator 350 has pushed the trigger member 386 by a total distance Y (Y>X) the flange of the trigger member has compressed the spring arrangement 382 and trigger member 386 abuts the sleeve 393.

Figure 6:
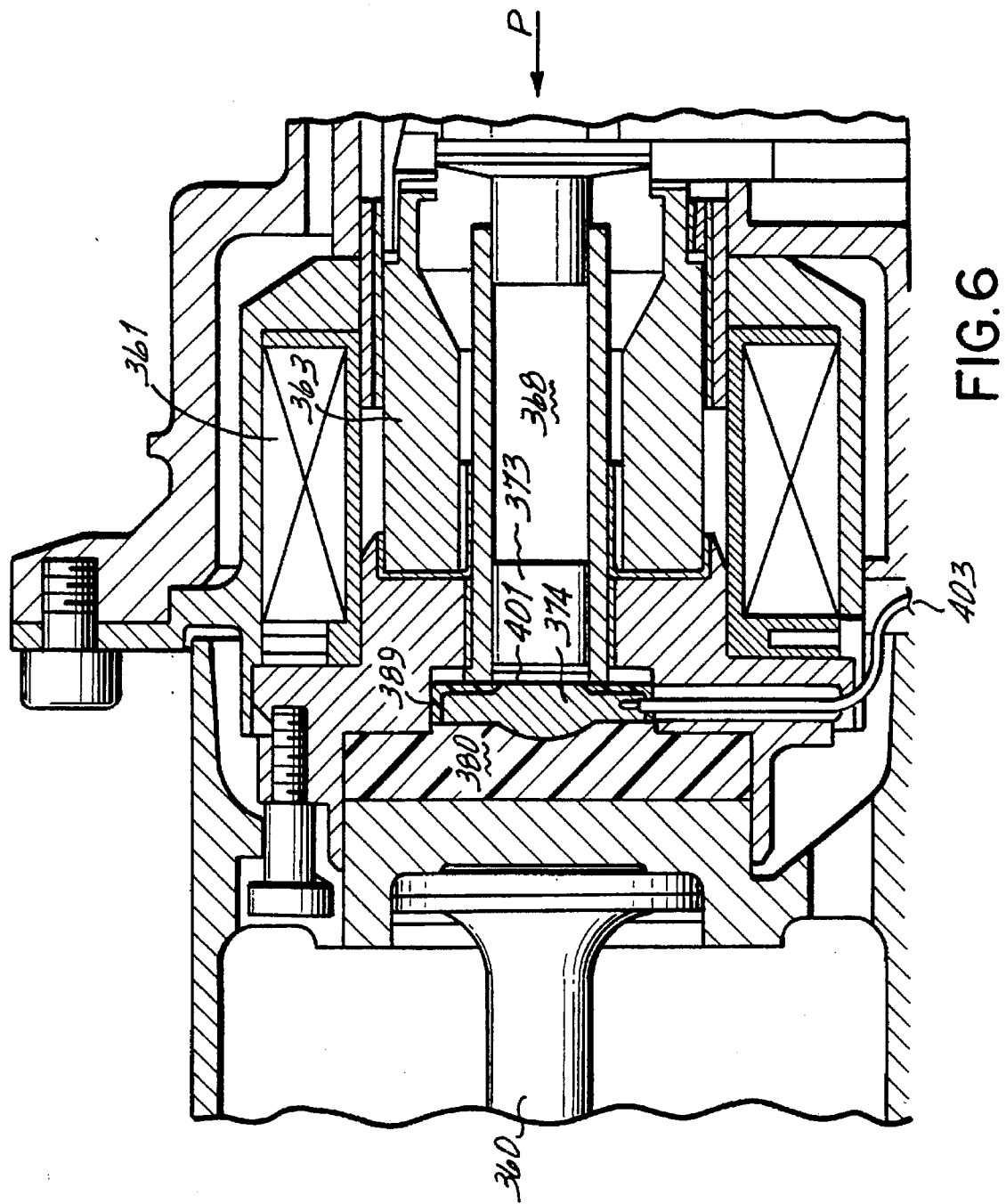
FIG. 6 shows a further embodiment of a control valve for a brake booster in an enlarged sectional view.

FIG. 6 shows a further embodiment of a control valve with a modified switch means. In this embodiment, the switch means is formed by the plate 374 which is mounted in a ring 389 which electrically insulates the plate 374 against the valve housing. The face 401 of the plate 374 oriented towards the free end 373 of the pin 368 can come into an electrical contact with the free end 373 of the pin 368 when the pin is moved into the direction P by an axial movement of the first actuator 350. Since the plate 374 is held by the electrically insulating rubber plate 380, the contact of the pin 368 with the plate 374 can be sensed through a wire 403 soldered or welded to the plate 374. Consequently, the potential of the pin 368 (usually ground potential) can be sensed by the electronic control device when contact between the pin 368 and the plate 374 is made.

The various embodiments of the switching means can be combined to have a redundant and hence more reliable sensing of the movement.

The embodiment shown in FIG. 7 differs from the embodiment shown in FIG. 2 in so far, that a contact element 381 is provided on the head 366 of the contact member. This contact member is surrounded by two disc springs 382, 383 which, in the non-activated position keep a trigger member 386 at a predetermined distance U from the contact member. This trigger member 386 is provided with a seat 388 for the distal end 387 of the actuating member 350. Upon an axial movement of the first actuator 350 by the distance U, a signal SF is triggered by the contact element 381. Again, this contact element 381 is mounted between the head portion 366 and the trigger member 386 so as to be electrically insulated from the head portion 366.

In the embodiment of FIG. 7, the distance U between the contact element 381 and the trigger member 386, as well as the spring force of the spring arrangement 382, 384 disposed between the trigger member 386 and the contact element 381, and the distance T between the pin 368 and the plate 374 as well as the spring arrangement 370 (in the embodiment of FIG. 2) between the head portion 366 and the stepped bore 364 are dimensioned such that upon the actuator 350 returning from an operative position into an inoperative position, the contact element 381 and the trigger member 386 are released from each other before the end portion 373 of the pin 368 is released from plate 374. This also means, that the contact element 381 and the trigger member 386 come into contact before the free end 373 of the pin 368 comes into contact with the plate 374 when the actuator 350 is moved from an inoperative position to an operative position. Since the physical properties of the springs 382, 384 and 370, respectively, are known as well as the distances T, T1 and U, respectively, it is possible to determine the condition for release of the electronically controlled booster from the time delay between the two signals SF and SG.

The embodiment of FIG. 7 is mounted in a electrically insulating housing 390.

The plate 374 can also be electrically insulated from the break booster housing and be connected to a specific electric potential so that defined electrical signals can be provided to the electronic control device.

In the afore-mentioned embodiments of FIGS. 2–7, the signal generation means provided a ground signal to the electronic control device when the actuating member or the pin contacted the signal generation means. Due to the various electronic devices in a vehicle, noise and electromagnetic radiation interferences may be superimposed on the ground potential. This can result in problems when further processing the signals in a subsequent electronic control device. In order to overcome such problems the embodiment of FIGS. 8 to 10 may be used as an alternative.

Figure 8:
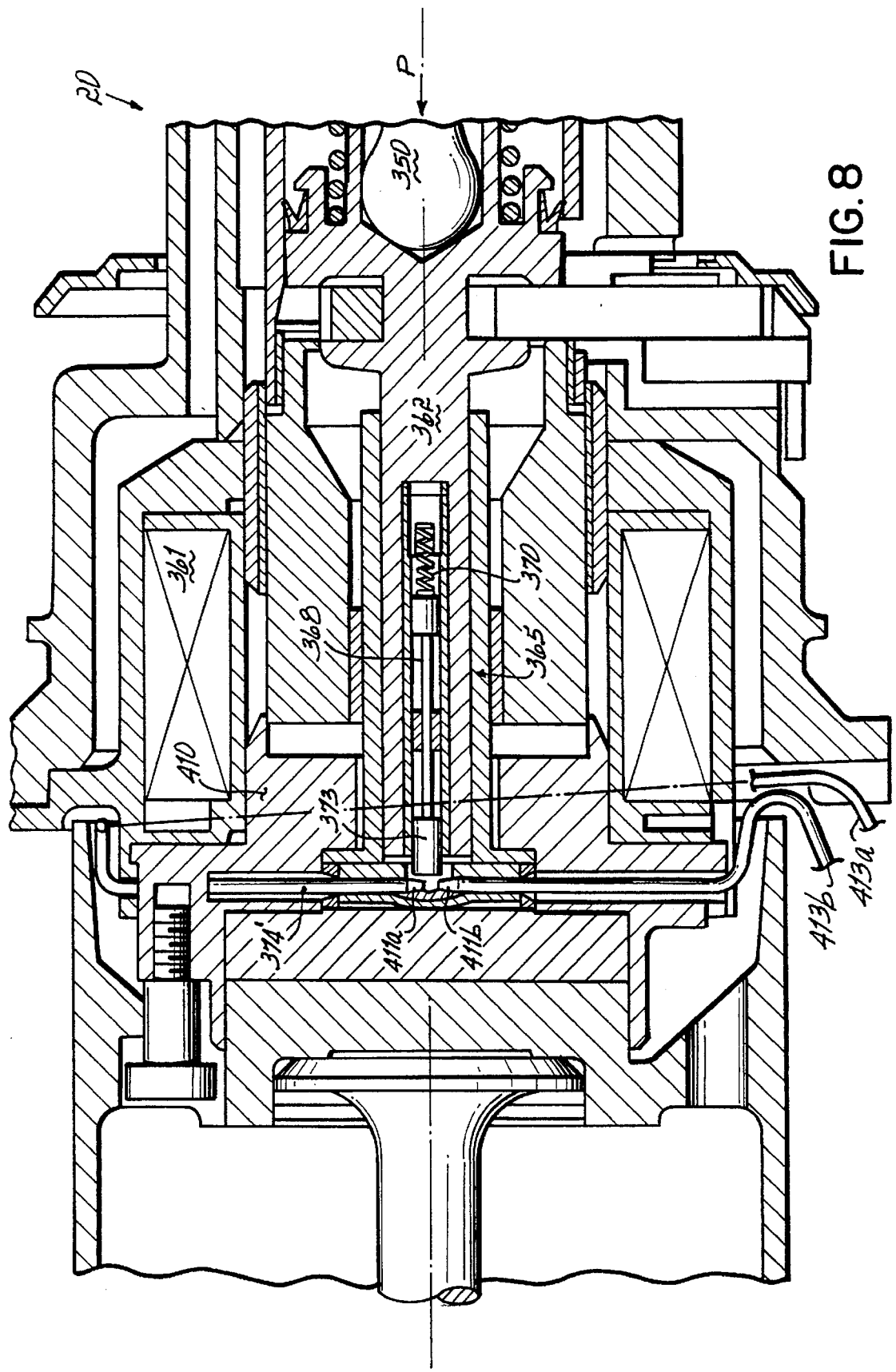
FIG. 8 shows a further embodiment of a control valve for a brake booster in an enlarged sectional view.

The embodiment of FIG. 8 corresponds to the embodiment of FIG. 2 in as far as the valve means 20, the electromagnetic actuation 361, the first and second actuation means 330 and 360 etc. are concerned. The signal generation means 365 are altered in the following manner: instead of having a uniform metallic plate 374 (as i.e. in FIG. 2), the plate 374' of FIG. 8 is provided with at least two contact areas which are electrically isolated from each other. The plate and its contact areas are mounted in an electrically isolated manner in the metallic ring 410. When the free end 373 of the pin 368 which is electrically conducting, comes into contact with the (at least two) contact areas 411a and 411b of the plate 374' in the operative position of the actuation means 350, the contact areas are bridged by the pin. The pin 368 is electrically insulated from the sleeve 362. The two contact areas 411a, 411b are provided with wires 413a, 413b which lead to the (not shown) electronical control device.

It is certainly possible to provide more than two contact areas 411a, 411b in order to increase the security of the signal generation. This however, requires further wires 413a, 413b as well as signal input terminals at the electronical control device.

The pin 368 is supported by a spring arrangement 370 at the end of pin 368 opposite to the free end 373 in order to provide for a contact making and contact braking between the free end 373 and the contact areas 411a and 411b.

Figure 9:
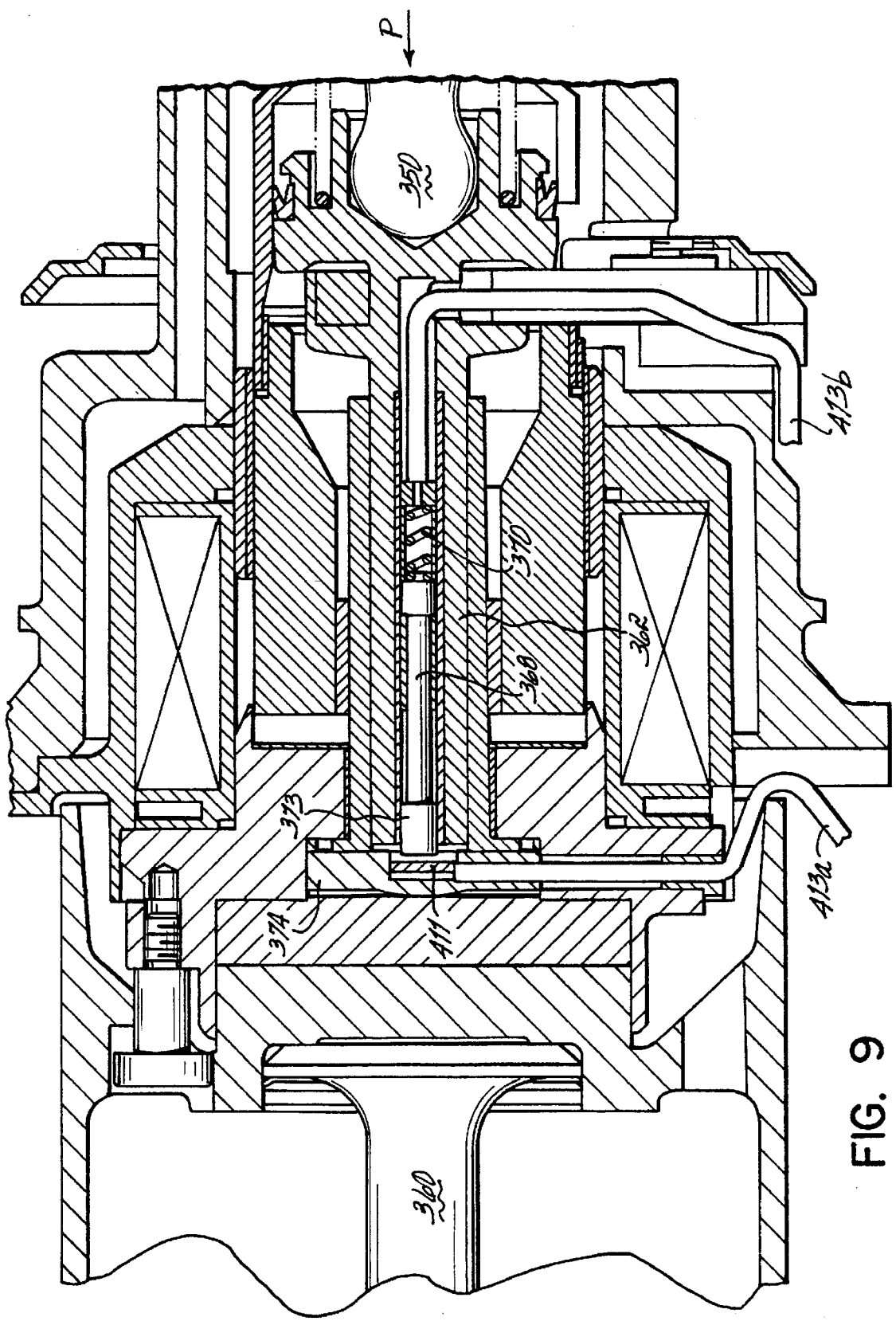
FIG. 9 shows a further embodiment of a control valve for a brake booster in an enlarged sectional view.

In the embodiment of FIG. 9, the plate 374 is provided with one (or more) contact areas 411 that is electrically insulated against the contact plate 374. It is, however, also possible to have the entire contact plate 374 be insulated against the ground potential of the metallic parts surrounding the plate 374. The contact area 411 can be brought into electrical and mechanical contact with the free end 373 of the pin 368 which is biased by a spring arrangement 370 in the direction towards the plate 374 and electrically insulated against the sleeve 362. The contact area 411 and the free end 373 of the pin 368 are provided with wires 413a, 413b which lead to the (not shown) electronical control device.

Figure 10:
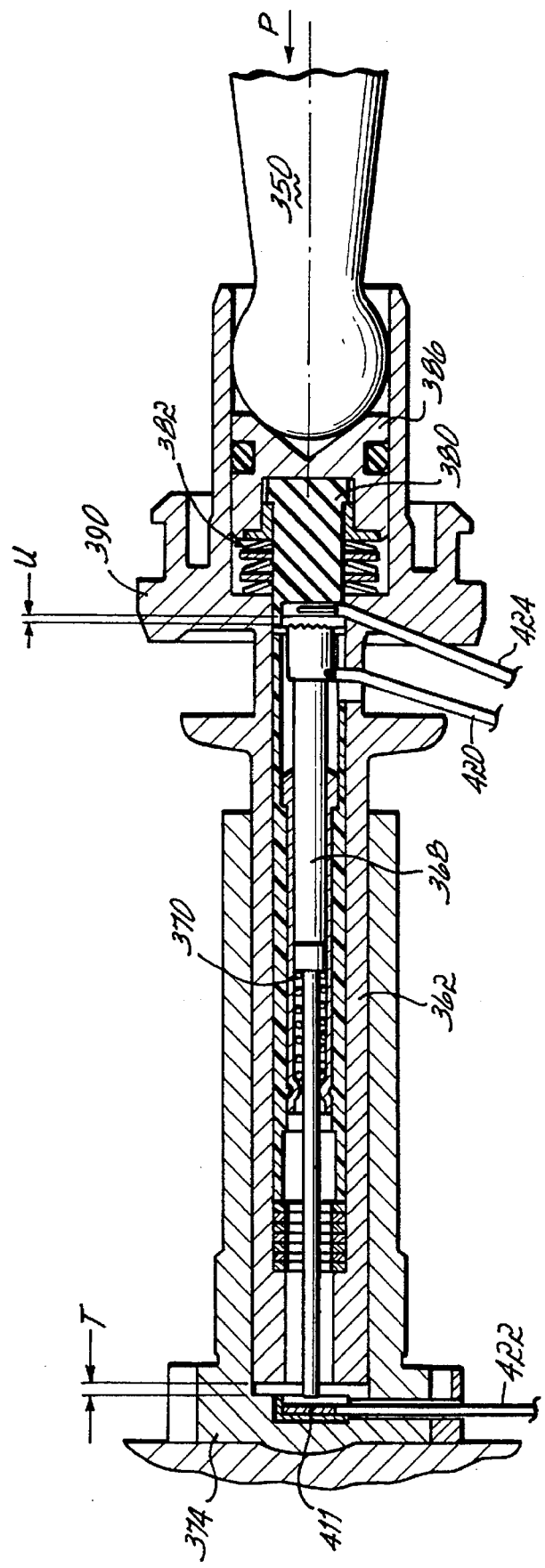
FIG. 10 shows a partial enlarged view of a further switch means to be used in the embodiment of FIG. 2.

FIG. 10 shows a modification of the switch means shown in FIG. 7. The main difference lies in the fact that a common signal input wire 420 leads to the pin 368 and that the plate 374 is provided with a first signal output wire 422 connected to a contact area 411 mounted in the plate 374 and a second signal output wire 422 connected to the spring loaded contact member 380. Again, the pin 368 is resiliently biased by a spring arrangement 370 and electrically insulated against the sleeve 362.

With the signals provided by the afore-mentioned embodiments of FIGS. 2 to 10, it is possible to sense the brake roll back. This is explained hereinafter with reference to FIG. 10. Upon operation of the brake pedal by the driver, the actuating means 350 is moved in the direction of the arrow P. Due to the dimensioning of the spring arrangements 370, 382 and the distances T and U in the first and second signal generation means, a first signal is provided at the wire 422. Upon a further movement of the first actuation means 350 into the direction of the arrow P, the spring arrangement 382 is compressed so that the path U is overcome and a second signal is provided after a time period depending on the force and speed with which the driver is operating the brake pedal, at the other wire 424.

In case the time difference between the occurrence of the first signal and the second signal is shorter than a predetermined period of time, the electronic activation of the valve means by operating the solenoid can be triggered by the electronic control device.

From the order of occurrence of the first and second signals provided by the first and second signal generation means, the different operation modes of the braking system can be sensed and distinguished. Depending on the dimensioning of the spring arrangements and the free general path of the first actuation means 350 and the pin 368, the first and second signals are provided in a certain order when the brake pedal is pressed and these signals will also occur in a specific order when the brake pedal is released by the driver. During the period of time when the brake pedal is held down in a depressed position, both signal are present simultaneously. Thus, the dynamics of the pressing down and releasing of the brake pedal can be determined from the order in which the signals from the first and second signal generation means are generated.

This means that not only the aspect of redundancy can be successfully handled by providing two (or more) independent signal generation means, but is also possible to detect and/or to determine critical and characteristic points in the path of the brake pedal actuation by a driver. If for example, the brake pedal is activated with a actuating force exceeding a certain threshold value and/or exceeding a predetermined actuation speed, the signals from the first and from the second signal generation means will occur within a predetermined period of time. If thereafter, a driver will release a brake pedal just slightly, only one of the two signal generation means will be released again and one of the signals will disappear, while the other signal will still be remain present. Only when the driver fully releases the brake pedal, the other signal generation means will sense this and the signal resulting from that signal generation means will also disappear.

This fail-safe and very efficient way of sensing the brake pedal operation is very effective and can be achieved by very reliable and cost-effective means.

We claim:

1. A vehicle brake system including an electronically controlled brake booster (10), comprising:
   a first actuator (350) connected to a second actuator (360) for transmitting to the same an actuating movement (P) of a brake pedal, wherein the second actuator (360) transmits the movement to a master brake cylinder,
   a signal generation means (365) disposed between said first and second actuators (350, 360) for generating a first signal to be supplied to a control means of the brake booster (10), wherein the signal generation means (365) is triggered by a relative movement between the first actuator and a housing of the brake booster, wherein the signal generation means (365) is received in a sleeve (362) and is in its direction of movement resiliently biased by a spring arrangement towards the first actuator (350), the latter covering a first distance X before it causes a triggering of the first signal by the signal generation means (365), and may cover a total distance Y (Y>X) before it abuts an abutment on the sleeve (362).

2. The vehicle brake system as defined in claim 1, characterized in that:
the signal generation means (365) is received in a bore of the sleeve as to the electrically insulated, and is biased by the spring arrangement against a projection.

3. The vehicle brake system as defined in claim 1, characterized in that:
the first actuator is resiliently supported by a spring arrangement against the sleeve.

4. A vehicle brake system including an electronically controlled brake booster (10), comprising:
a first actuator (350) and a second actuator (360) mounted coaxially along an axis (A),
the first actuator (350) connected to the second actuator (360) for transmitting to the second actuator (360) an actuating movement (P) of a brake pedal, wherein the second actuator (360) transmits the movement to a master brake cylinder,
a signal generation means (365) disposed between the first and second actuators (350, 360) for generating a first signal to be supplied to a control means of the brake booster (10), wherein the signal generation means (365) is triggered by a relative movement between the first actuator (350) and the second actuator (360), the signal generation means (365) further including a pin (368, 391) and a contact member (374; 365), wherein the pin (368, 391) upon contacting the contact member (374, 365), supplies said first signal to the control means, and
the pin (368, 391) and the contact member (374, 365) being mounted along the axis (A).

5. The vehicle brake system as defined in claim 4, characterized in that:
the pin (368) has a head portion (366) and is received in a sleeve (362), and
the head portion (366) is resiliently biased by a spring arrangement (370).

6. The vehicle brake system as defined in claim 5 wherein the contact member is a plate 374 located opposite the head portion (366) of the pin (368), characterized in that:
the sleeve (362) is received in a tube (376) so as to be axially slideable therein, said tube (376) extending at a first end facing the plate (374) beyond the sleeve (362) by a distance T1, and an end (373) of the pin (368) being even with the sleeve (362) in its inoperative position.

7. The vehicle brake system as defined in claim 4 wherein the pin (368) has a head portion (366) and the contact member is a plate (374) located opposite the head portion (366) of the pin (368), characterized in that:
an end (373) of the pin (368) facing the plate (374) has a predetermined distance T from the plate (374), in an inoperative position, and
upon axial movement of the first actuator (350) by a distance T1 the plate (374) contacts the end (373) of the pin (368) and the first signal is triggered, and a further axial movement of the actuator (350) by a distance T-T1 causes the sleeve (362) to contact the plate (374) and to urge the plate (374) against the second actuator (360), wherein the contact member (365) in the sleeve (362) withdraws toward the first actuator (350).

8. The vehicle brake system as defined in claim 7, characterized in that:
the pin (368) is mounted in the sleeve (362) so as to be electrically insulated.

9. The vehicle brake system as defined in claim 8, characterized in that:
a contact element (380) is provided adjacent the head portion (366) of the pin (368) which, upon an axial movement of the first actuator (350) by a distance U, triggers a second signal.

10. The vehicle brake system as defined in claim 9, characterized in that:
a trigger member (386) is provided between the contact element (380) and the first actuator (350) which is resiliently biased by a spring arrangement (382, 384) against the first actuator (350) and is spaced from the contact element (380) by a distance U, in the inoperative position.

11. The vehicle brake system as defined in claim 10, characterized in that:
the contact element (380) is mounted so as to be electrically insulated from the head portion (366).

12. The vehicle brake system as defined in claim 10, characterized in that:
the distance U between the contact element (380) and the trigger member (386), as well as the spring arrangement (382, 384) disposed between the trigger member (386) and the contact element (380), and the distance T between the pin (368) and the plate (374), as well as the spring arrangement (370) between the head portion (366) and a stepped bore (364) are dimensioned such that, upon the first actuator (350) returning from an operative position to an inoperative position, the contact element (380) and the trigger member (386) are released before the pin (368) is released from the plate (374).

13. The vehicle brake system as defined in claim 4 wherein the pin (368) has a head portion (366) and the contact member is a plate (374) located opposite the head portion (366) of the pin (368), characterized in that:
the plate (374) is electrically insulated from the brake booster housing.

14. The vehicle brake system as defined in claim 4, characterized in that:
the signal generation means (365) is received in a sleeve (362) and is in its direction of movement resiliently biased by a spring arrangement (370) towards the first actuator (350), said first actuator (350) covering a first distance X before it causes a triggering of a signal by the signal generation means (365), and may cover a total distance Y (Y>X) before it abuts an abutment (382) on the sleeve (362).

15. The vehicle brake system as defined in claim 14, characterized in that:
the signal generation means (365) is received in a bore (364) of the sleeve (362) so as to be electrically insulated, and biased by the spring arrangement (370) against a projection.

16. The vehicle brake system as defined in claim 14, characterized in that the first actuator (350) is resiliently supported by a spring arrangement (370) against the sleeve (362).

17. The vehicle brake system as defined in claim 4 wherein the pin (368) has a head portion (366) and the contact member is a plate (374) located opposite the head portion (366) of the pin (368), characterized in that:
the plate (374) is provided with at least two contact areas (411a, 411b) which are electrically isolated from each other and are mounted such that the electrically conducting pin (368), coming into contact with the plate (374) in its operative position, bridges the at least two contact areas (411a, 411b), which are operatively connected to the control means to provide a signal thereto.

18. A vehicle brake system which includes an electronically controlled brake booster, comprising:

a brake booster housing which is rotationally symmetric with respect to an axis;

a first actuator (350) and a second actuator (360) mounted coaxially along the axis (A), the first actuator (350) connected to the second actuator (360) for transmitting to the second actuator (360) an actuating movement (P) of a brake pedal, wherein the second actuator (360) transmits the movement to a master brake cylinder, a brake booster controller for controlling operation of the brake booster;

a first spring-loaded switch operatively connected to the brake booster controller and residing between the first and second actuators (350, 360) along the axis, for generating a first control signal upon relative movement between the first and second actuators;

a second spring-loaded switch operatively connected to the brake booster controller and residing between the first and second actuators (350, 360) along the axis, for generating a second control signal upon relative movement between the first and second actuators, the first and second spring-loaded switches adapted to generate the first and second signals in a predetermined sequence due to different spring parameters, whereby the brake booster controller uses the first and second signals to determine characteristics of brake pedal actuation by the driver.

19. The vehicle brake system as defined in any one of claims 1, 2, 3 and 4–17, characterized in that:

the signals of at least two different signal generation means are used for the signal generation in the control means.

20. The vehicle brake system as defined in claim 19, characterized in that a first signal from a first signal generation means and a second signal from a second signal generation means are used to sense and to distinguish the operational modes of the braking system.

21. The vehicle brake system as defined in claim 20, characterized in that the dynamics of the pressing down and releasing of the brake pedal is determined from the successive order in which the signals from the first and the second signal generation means occur, depending on the characteristics of the spring arrangements as well as the distances between the sensing means and the actuating means for the sensing means in dependency from the force and/or the speed with which the brake pedal is pressed down and/or released.

22. The vehicle brake system as defined in claim 19, characterized in that a time delay of a predetermined duration between a first signal from a first signal generation means and a second signal generation means is used to have the electronic control device to initiate an automatic braking.

23. The vehicle brake system as defined in claim 19, characterized in that the properties of the spring arrangements are dimensioned such, that a compression of at least one of said spring arrangements resulting in supplying a signal by a first or a second signal generation means is used as a threshold value to actuate the electronic control device to initiate an automatic braking.

* * * * *